United States Patent
Bickford et al.

(10) Patent No.: US 10,684,875 B2
(45) Date of Patent: Jun. 16, 2020

(54) SYNCHRONIZATION OF A VIRTUAL MACHINE ACROSS MOBILE DEVICES

(71) Applicant: AT&T Intellectual Property I, L.P., Atlanta, GA (US)

(72) Inventors: Jeffrey E. Bickford, Somerset, NJ (US); Ramon Caceres, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 940 days.

(21) Appl. No.: 13/706,451

(22) Filed: Dec. 6, 2012

(65) Prior Publication Data

US 2014/0164591 A1   Jun. 12, 2014

(51) Int. Cl.
*G06F 9/455* (2018.01)

(52) U.S. Cl.
CPC .......... *G06F 9/45558* (2013.01); *G06F 2009/45583* (2013.01)

(58) Field of Classification Search
CPC .. G06F 12/16; G06F 9/45533; G06F 9/45558; G06F 2009/45583
See application file for complete search history.

(56) References Cited

U.S. PATENT DOCUMENTS

| | | | |
|---|---|---|---|
| 7,962,703 B1 | 6/2011 | Shah et al. | |
| 8,181,002 B1 * | 5/2012 | Yip | G06F 9/383 712/220 |
| 2004/0010787 A1 * | 1/2004 | Traut | G06F 9/4856 718/1 |
| 2004/0225694 A1 * | 11/2004 | Flanagin | G06F 17/30575 |
| 2010/0107158 A1 * | 4/2010 | Chen | G06F 11/1438 718/1 |
| 2011/0113426 A1 | 5/2011 | Kung et al. | |
| 2011/0208908 A1 * | 8/2011 | Chou | G06F 11/1662 711/112 |
| 2011/0289345 A1 * | 11/2011 | Agesen | G06F 11/2097 714/4.11 |
| 2012/0072393 A1 | 3/2012 | Kumar et al. | |
| 2012/0290657 A1 * | 11/2012 | Parks | H04M 1/72525 709/204 |

(Continued)

OTHER PUBLICATIONS

Microsoft TechNet—About Virtual Machine Checkpoints Date: Jan. 13, 2012.*

(Continued)

*Primary Examiner* — Tonia L Dollinger
*Assistant Examiner* — Ishrat Rashid
(74) *Attorney, Agent, or Firm* — Cantor Colburn LLP

(57) ABSTRACT

A mobile device including a memory including computer-executable instructions for synchronizing a virtual machine and a processor executing the computer-executable instructions, the computer-executable instructions, when executed by the processor, cause the processor to perform operations including executing a virtual machine using a memory; executing a hypervisor providing a synchronization daemon, the synchronization daemon monitoring the memory, the synchronization daemon generating a checkpoint indicating a change in the memory; the hypervisor initiating transmission of the change in the memory over a wireless network for delivery to a standby mobile device to synchronize the virtual machine on the standby mobile device.

10 Claims, 4 Drawing Sheets

(56) References Cited

U.S. PATENT DOCUMENTS

2013/0052991 A1* 2/2013 Naftolin ............... H04W 8/22
   455/411
2013/0212205 A1* 8/2013 Flockhart ............. H04L 69/40
   709/208

OTHER PUBLICATIONS

Security-Enriched Urban Computing and Smart Grid-Tai-hoon Kim, Adrian Stoica, Ruay-Shiung Chang. pp. 387-392; Retrieved: https://books.google.com/books?id=PLGrCAAAQBAJ&lpg=PA389&ots=TK2Y-V1sBc&dq=sending%20checkpoints%20based%20on%20operating%20conditions%20of%20devices&pg=PA389#v=onepage&q&f=true (Year: 2010).*

* cited by examiner

SYNCHRONIZATION OF A VIRTUAL MACHINE ACROSS MOBILE DEVICES

BACKGROUND

The present disclosure relates generally to synchronization of a virtual machine, and more particularly, to methods, systems, and computer program products for synchronization of a virtual machine across mobile devices.

People increasingly rely on mobile devices in their everyday lives, often having multiple devices such as a smartphone and a tablet. The utility of these devices would improve if users could switch seamlessly from one device to another. In particular, if they could continue using applications on the second device exactly where they left off on the first device, with both data and computation state preserved across the switch without apparent delay. For example, a user who starts watching a video on a smartphone may want to continue watching the video on the larger display provided by a tablet.

A limited form of such device switching is currently available through per-application data synchronization. For example, existing services synchronize changes to calendars, address books, and a few other explicitly supported applications. Some other applications provide their own synchronization facilities. However, this approach requires separate, and often specific, support to be built into each application. A general solution that works for all applications would scale better to the rapidly growing set of mobile applications, which already number in the hundreds of thousands.

There are several established techniques for migrating virtual machine state between hardware hosts. For example, one technique transfers a virtual machine image while the virtual machine continues to run in the originating host, only suspending the virtual machine for an imperceptible period while control is finally switched to the receiving host. However, this technique transfers the complete virtual machine memory image each time, an operation that generally involves gigabytes of data and would be prohibitive over a slow wireless link. In addition, this technique assumes a high-speed shared storage medium between the hosts involved, so that disk state need not be transferred at migration time. Mobile devices do not enjoy such shared storage.

BRIEF SUMMARY

Exemplary embodiments include a mobile device including a memory including computer-executable instructions for synchronizing a virtual machine; and a processor executing the computer-executable instructions, the computer-executable instructions, when executed by the processor, cause the processor to perform operations including executing a virtual machine using a memory; executing a hypervisor providing a synchronization daemon, the synchronization daemon monitoring the memory, the synchronization daemon generating a checkpoint indicating a change in the memory; the hypervisor initiating transmission of the change in the memory over a wireless network for delivery to a standby mobile device to synchronize the virtual machine on the standby mobile device.

Other exemplary embodiments include a method for synchronizing a virtual machine, the method including executing a virtual machine at an active mobile device, the virtual machine using a memory; monitoring the memory; generating a checkpoint indicating a change in the memory; and initiating transmission of the change in the memory over a wireless network for delivery to a standby mobile device to synchronize the virtual machine on the standby mobile device.

Other exemplary embodiments include a computer program product, tangibly embodied on a computer readable medium, for synchronizing a virtual machine, the computer program product including instructions that, when executed by a computer, cause the computer to perform operations including executing a virtual machine at an active mobile device, the virtual machine using a memory; monitoring the memory; generating a checkpoint indicating a change in the memory; and initiating transmission of the change in the memory over a wireless network for delivery to a standby mobile device to synchronize the virtual machine on the standby mobile device.

Other exemplary embodiments include a system including a memory including computer-executable instructions for synchronizing a virtual machine; and a processor executing the computer-executable instructions, the computer-executable instructions, when executed by the processor, cause the processor to perform operations including executing a checkpoint engine, the checkpoint engine executing a process including: initiating distribution of a base virtual machine image to registered standby mobile devices over a wireless network; receiving a checkpoint from an active mobile device, the checkpoint indicating a change in a memory of the active mobile device; detecting a first registered standby mobile device connected to the checkpoint engine; and transmitting the checkpoint to the first registered standby mobile device over the wireless network.

Other exemplary embodiments include a method for synchronizing a virtual machine, the method including executing a checkpoint engine, the checkpoint engine executing a process including initiating distribution of a base virtual machine image to registered standby mobile devices over a wireless network; receiving a checkpoint from an active mobile device, the checkpoint indicating a change in a memory of the active mobile device; detecting a first registered standby mobile device connected to the checkpoint engine; and transmitting the checkpoint to the first registered standby mobile device over the wireless network.

Other exemplary embodiments include a computer program product, tangibly embodied on a computer readable medium, for synchronizing a virtual machine, the computer program product including instructions that, when executed by a computer, cause the computer to perform operations including executing a checkpoint engine, the checkpoint engine executing a process including initiating distribution of a base virtual machine image to registered standby mobile devices over a wireless network; receiving a checkpoint from an active mobile device, the checkpoint indicating a change in a memory of the active mobile device; detecting a first registered standby mobile device connected to the checkpoint engine; and transmitting the checkpoint to the first registered standby mobile device over the wireless network.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
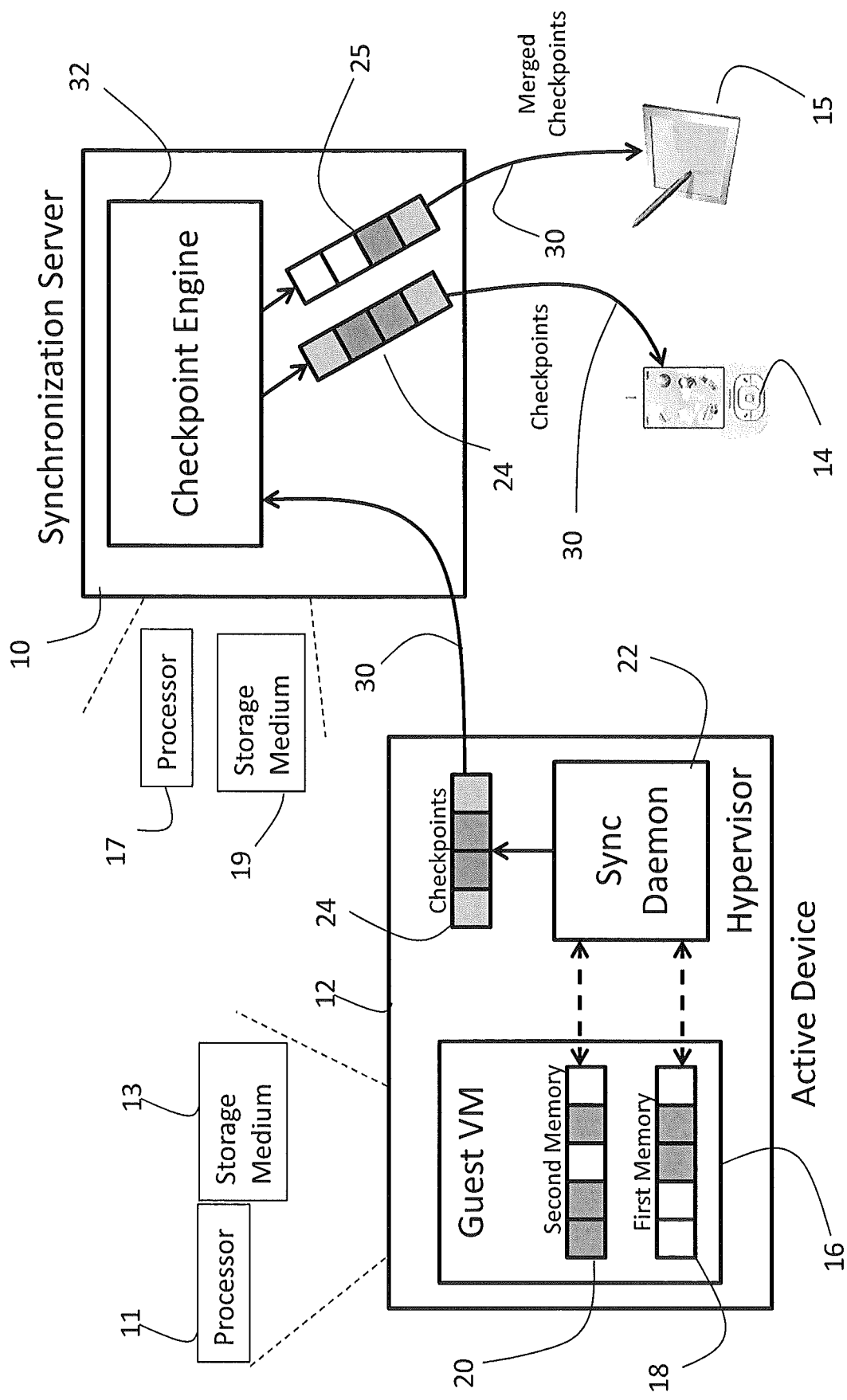
FIG. 1 depicts a system for synchronizing a virtual machine across mobile devices in an exemplary embodiment.

FIG. 1 depicts a system for synchronizing a virtual machine across mobile devices in an exemplary embodiment. The system includes a synchronization server 10 that collects checkpoints from an active mobile device 12 and distributes the checkpoints to standby mobile devices 14 and 15 to facilitate transitioning a virtual machine from active device 12 to standby devices 14 and 15. Active mobile device 12 is a mobile device (e.g., phone, PDA, tablet) executing a virtual machine 16. Active mobile device 12 may include a processor 11 executing a computer program stored on a storage medium 13 to perform the operations described herein. Virtual machine 16 utilizes both a first memory 18 and a second memory 20 during execution. First memory 18 may correspond to a disk storage (e.g., 64 GB) and second memory 20 may correspond to execution memory (e.g., 2 GB RAM). Although two memory devices 18 and 20 are shown in FIG. 1, it is understood that active mobile device 12 may include less or more memory devices, and embodiments are not limited to two memory devices.

A hypervisor runs along with the virtual machine 16 and includes a synchronization daemon 22. Synchronization daemon 22 monitors the state of virtual machine 16 and generates checkpoints indicative of the state of virtual machine 16. Checkpoints may include a time component, a virtual machine status and/or virtual machine data. Virtual machine data may be represented as differential data indicating what data has changed since the last checkpoint. Differential data for first memory 18 and second memory 20 may be handled using different techniques as described in further detail herein. Synchronization daemon 22 transfers checkpoints 24 to synchronization server 10 over a network 30. Network 30 may be implemented using a variety of network topologies, including multiple wireless networks (e.g., cellular, wifi) and wired networks.

Synchronization server 10 executes a checkpoint engine 32 that collects checkpoints from active mobile device 12 and distributes the checkpoints to standby mobile devices 14 and 15. Synchronization server 10 may include a processor 17 executing a computer program stored on a storage medium 19 to perform the operations described herein. Synchronization server 10 provides checkpoints to standby mobile devices 14 and 15 so that the virtual machine 16 can be smoothly transferred from active mobile device 12 to one of standby mobile devices 14 and 15 to reduce switching latency. Synchronization server 10 transfers checkpoints 24 to the standby mobile devices 14 and 15 over network 30. Network 30 may be implemented using a variety of network topologies, including wireless networks and wired networks. Transfer of checkpoints to standby mobile devices 14 and 15 is described in further detail herein with reference to FIG. 3.

Figure 2:
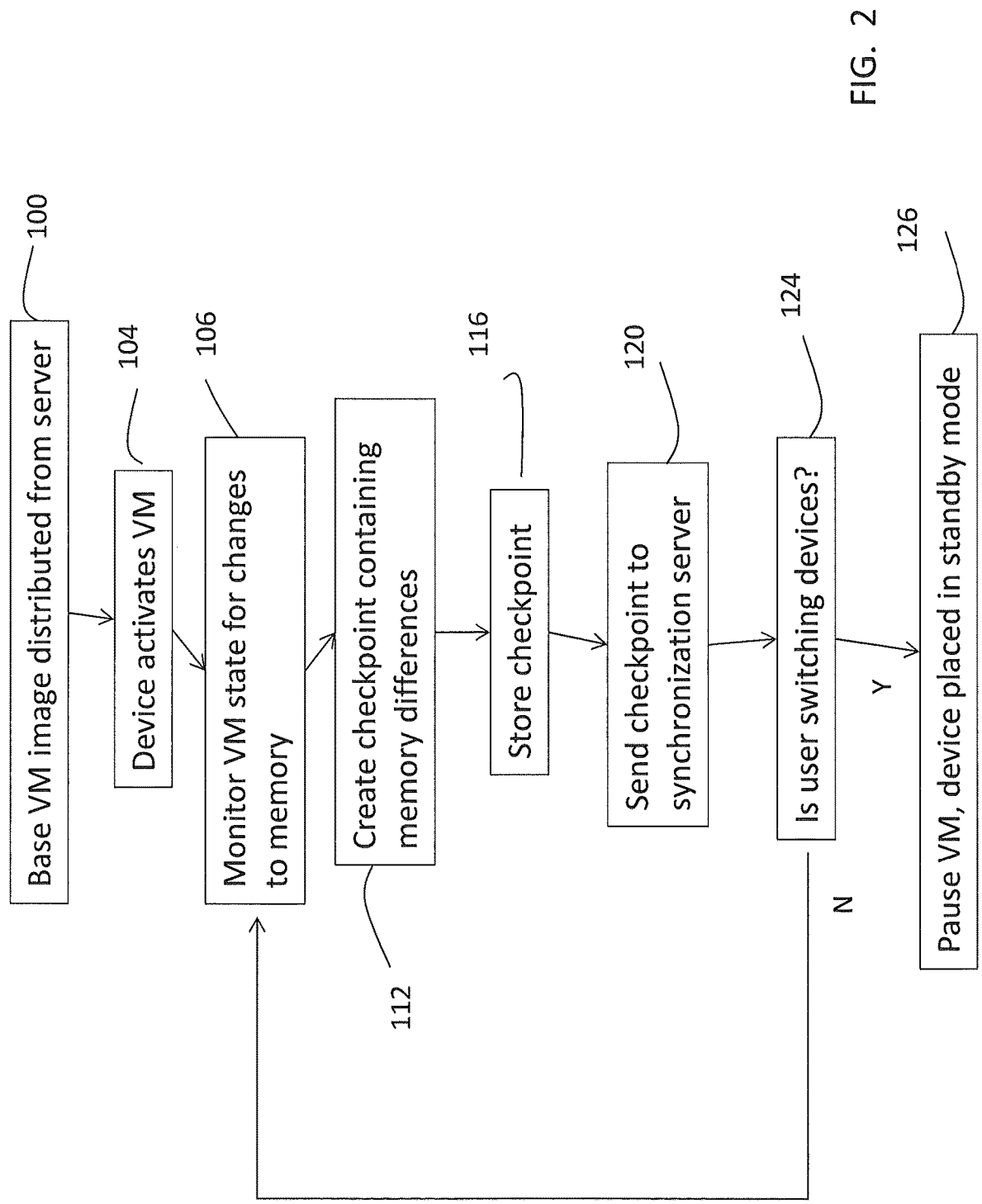
FIG. 2 depicts a process for transferring checkpoints from an active device to a synchronization server in an exemplary embodiment.

FIG. 2 is a flowchart of a process for collecting and transferring checkpoints from active mobile device 12 to synchronization server 10. The process begins at 100, where a standby mobile device 14 or 15 first registers with synchronization server 10 and receives a pre-distributed base virtual machine. At 104 the user decides to switch to this device, transitioning this device to an active state and begins using active mobile device 12.

While active mobile device 12 is active, at 106, synchronization daemon 22 monitors virtual machine 16 to detect changes in state and in memory, for example, first memory 18 and second memory 20. Synchronization daemon 22 also includes a timer and monitors certain events to determine when to checkpoint virtual machine 16. Monitoring the state of a virtual machine 16 can be implemented in multiple different ways depending on memory size and usage. For example, if second memory is much smaller than first memory and updated frequently, a complete copy can be stored as a reference memory in first memory and compared with the current state at the time of a checkpoint. In a second example, if first memory is large but updated infrequently, then copy on write techniques can be used as an efficient method to keep track of changes. In a third example, changes to any memory can be monitored by maintaining a bitmap of which memory regions have changed since the last checkpoint, often called a dirty bitmap.

At 112 it is determined that a checkpoint of virtual machine 16 should be made and delivered to synchronization server 10. Determining whether a checkpoint is needed may be based on a variety of factors. In one embodiment, checkpoints are periodic, based on a time interval. In other embodiments, a checkpoint occurs based on a state of active mobile device 12. For example, if the power off button on active mobile device 12 is pressed, this may suggest that the user is going to migrate virtual machine 16 to a standby mobile device 14 or 15. In other embodiments, location of the active mobile device 12 may indicate a checkpoint. For example, if the user has returned home from work, then this may suggest that the user will migrate virtual machine 16 from active mobile device 12 (e.g., a phone) to a standby mobile device 14 or 15 (e.g., a tablet). In other embodiments, a user pattern may indicate when a checkpoint should be made. For example, if a user typically uses their smartphone, but turns on their tablet at 9 pm to stream movies or television, than this observed user pattern may indicate that the smartphone must send checkpoints prior to 9 pm to minimize switching latency. In other embodiments, network connectivity may indicate the best time to checkpoint. For example, if active mobile device 12 enters an area having a higher network bandwidth (e.g., a wifi hotspot) then this may suggest that the user will migrate virtual machine 16 from active mobile device 12 (e.g., a phone) to a larger screened standby mobile device 14 or 15 (e.g., a tablet). In other embodiments, the presence of registered standby mobile devices 14 and 15 near active mobile device 12 may indicate a time to checkpoint, as there is an increased likelihood that a virtual machine 16 on active mobile device 12 will be transferred to a standby mobile device 14 or 15. In other embodiments, battery life of active mobile device 12 may indicate a good time to checkpoint. As battery life on active mobile device 12 decreases, the likelihood increases that virtual machine 16 on active mobile device 12 will be transferred to a standby mobile device 14 or 15.

Once a checkpoint is complete, flow proceeds to 116 where the checkpoint is stored for future reference during the next round of virtual machine monitoring.

At 120, the checkpoint is transferred from synchronization daemon 22 to synchronization server 10.

At 124, if the checkpoint was initiated due to a user switching devices, virtual machine 16 is paused and active mobile device 12 is placed in standby mode at 126. If not, the process loops back to 106 and synchronization daemon 22 continues to monitor the state of virtual machine 16.

Figure 3:
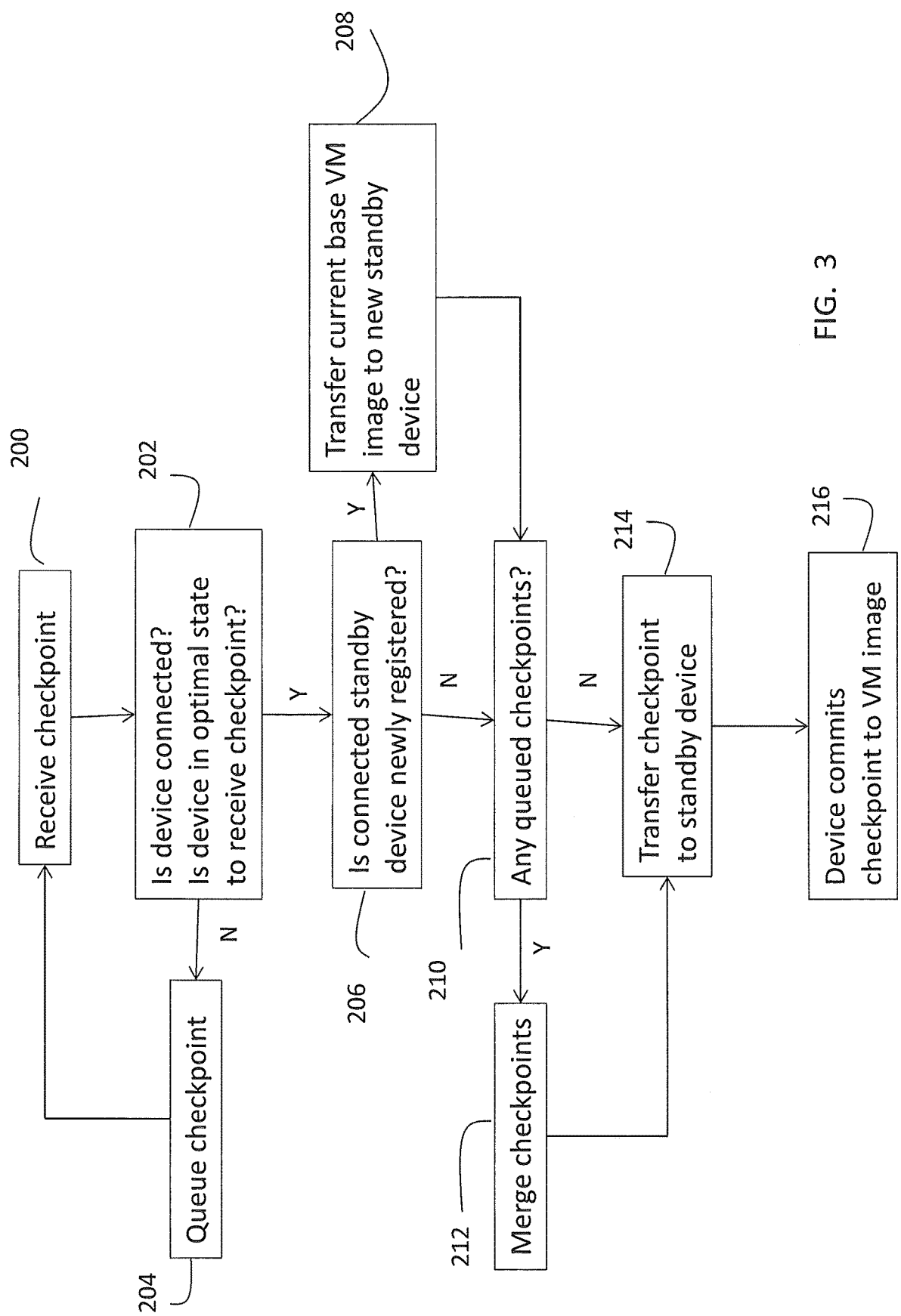
FIG. 3 depicts a process for transferring checkpoints from a synchronization server to standby devices in an exemplary embodiment.

FIG. 3 depicts a process for transferring checkpoints from synchronization server 10 to standby mobile devices 14 and 15 in an exemplary embodiment. In the example discussed herein, standby mobile device 14 has network connectivity with synchronization server 10. Standby mobile device 15 is not connected with synchronization server 10 initially, but establishes a connection at a later time.

At 200, synchronization server 10 receives a new checkpoint from active mobile device 12. For each mobile device that has registered with the synchronization server 10, the following process occurs. A registered mobile device is a mobile device that has been registered by a user as belonging to a group of mobile devices for which synchronization of virtual machines across the mobile devices is desired. The user may register the mobile devices through synchronization server 10 during an initial set up process. The mobile devices may be identified by an address (e.g., a MAC address, phone number, etc.). In this manner, a user can control which mobile devices participate in the synchronization of a virtual machine.

For each mobile device, the synchronization server 10 checks if the mobile device is connected. A connected mobile device is a mobile device that has a current connection with synchronization server 10 over network 30. At 202, synchronization server 10 determines if the mobile device is both connected and in a state optimal to receive a checkpoint. Synchronization server 10 may determine that the mobile device is disconnected or that due to the environment the mobile device is in, such as low bandwidth connectivity, the checkpoint is to be queued at 204 for later transmission.

At 206, synchronization server 10 has identified that this mobile device should receive the checkpoint. If the mobile device is newly registered and has not received the current base virtual machine yet, synchronization server 10 transfers the current base virtual machine to the standby mobile device at 208. If not, the flow proceeds to 210.

At 210, synchronization server 10 determines if the standby mobile device has any queued checkpoints due to the standby mobile device being previously disconnected or in a low bandwidth environment. This is shown, for example, in FIG. 1 as standby mobile device 15. If so, queued checkpoints are merged together in 212 to form a single merged checkpoint 25 (FIG. 1). Merged checkpoint 25 is a cumulative checkpoint representing multiple changes in virtual machine 16. For example, if a byte of virtual machine 16 changed from a first state to a second state, and then from the second state to a third state, this would generate two checkpoints, both of which would be sent to connected standby mobile device 14. These checkpoints would be merged at 212 to reflect a change in the byte from the first state to the third state. Merging checkpoints reduces the number of checkpoints needed to be sent to standby mobile device 15, once standby mobile device 15 is connected to synchronization server 10.

At 214, the checkpoint is transferred to the standby mobile device. Standby mobile device 14 applies the checkpoint 24 to the standby virtual machine on standby mobile device 14 so that the virtual machine state at standby mobile device 14 matches that of active mobile device 12. Similarly, standby mobile device 15, once connected to synchronization server 10, applies merged checkpoint 25 to the standby virtual machine on standby mobile device 15 so that the virtual machine state at standby mobile device 15 matches that of active mobile device 12. At 216, the standby mobile device 14 commits checkpoint 24 to the current virtual machine image and standby mobile device 15 commits merged checkpoint 25 to the current virtual machine image. When a user switches a virtual machine 16 between devices (e.g., from active mobile device 12 to standby mobile device 14), there is only a small amount of data (e.g., a final checkpoint) left to transfer before the virtual machines on both devices become fully consistent. This switch can be made quickly enough that the user will not notice any delay.

Embodiments take into consideration constraints of the mobile network environment. For example, intermittent network connectivity may delay dissemination of checkpoints. By merging checkpoints during periods of no connectivity, embodiments compensate for intermittent network connectivity. Similarly, bandwidth, processing, and storage limitations of mobile devices are addressed by transferring only the portions of virtual machine memory that have actually changed. By periodically transferring checkpoints to standby devices, the delay (or switch penalty) when switching a virtual machine from an active device to a standby device is reduced.

In alternate embodiments, network connectivity may be substantial enough to transfer entire memory pages having a change in that page (referred to as dirty pages). For example, should active mobile device 12 and standby mobile device 14 have sufficient bandwidth, then dirty pages may be transferred from active mobile device 12 with a checkpoint, and subsequently forwarded to standby mobile device 14. This technique reduces the amount of computation required for a checkpoint as calculating memory differences is no longer needed.

Figure 4:
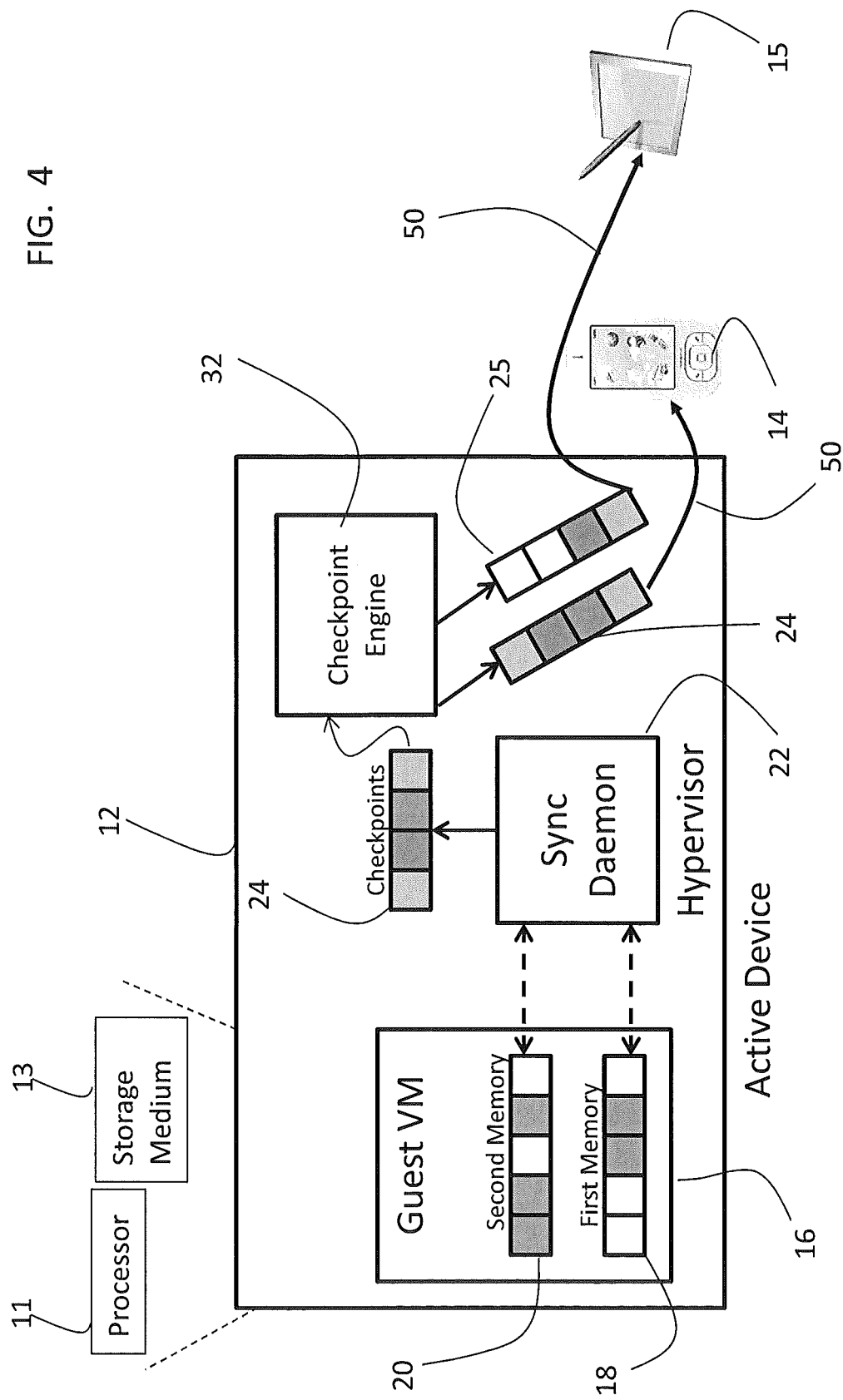
FIG. 4 depicts a system for synchronizing a virtual machine across mobile devices in an exemplary embodiment.

Embodiments described above use synchronization server 10 to distribute the base virtual machine image and checkpoints (either sequential or merged) to standby mobile devices 14 and 15. In alternate embodiments, standby mobile devices 14 and 15 can receive the base virtual machine image and checkpoints (either sequential or merged) from active mobile device 12 directly using a local wireless device-to-device network 50 (e.g., Bluetooth, NFC). FIG. 4 depicts an exemplary embodiment in which active mobile device 12 executes the checkpoint engine 32 and serves as a synchronization server. Active mobile device 12 can distribute the base virtual machine image, checkpoints 24 and merged checkpoints 25 in a manner similar to synchronization server 10 described above. Active mobile device 12 detects registered standby mobile devices within range of a local wireless device-to-device network 50. In FIG. 4, active mobile device 12 distributes the base virtual machine image, checkpoints 24 and merged checkpoints 25 using a local wireless device-to-device network 50.

Embodiments provide a seamless experience between multiple devices while reducing both the synchronization delay and data required. Embodiments maintain virtual machine application state across devices without customizing each application and without synchronizing to multiple different 3rd party services.

As described above, the exemplary embodiments can be in the form of processor-implemented processes and devices for practicing those processes, such as active mobile device 12, synchronization server 10 and standby mobile devices 14 and 15. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A system comprising:
   a memory comprising computer-executable instructions for synchronizing a virtual machine; and
   a processor executing the computer-executable instructions, the computer-executable instructions, when executed by the processor, cause the processor to perform operations comprising:
   executing a checkpoint engine, the checkpoint engine executing a process including:
      initiating distribution of a base virtual machine image to registered standby mobile devices over a wireless network;
      receiving a checkpoint from an active mobile device, the checkpoint indicating a change in a memory of the active mobile device, the active mobile device being a separate device from the checkpoint engine;
      detecting a first registered standby mobile device of the registered standby mobile devices connected to the checkpoint engine, the first registered standby mobile device being a separate device from the checkpoint engine and the active mobile device;
      transmitting the checkpoint to the first registered standby mobile device over the wireless network;
      queuing checkpoints to create queued checkpoints in response to the standby mobile device being disconnected or in a low bandwidth environment; and
      merging successive queued checkpoints from the active mobile device to define a merged checkpoint representing changes in the virtual machine from a first state to a second state, and then from the second state to a third state;
   wherein the checkpoint received from the active mobile device is created at the active mobile device in response to operating conditions of the active mobile device including power status, battery life and network connectivity.

2. The system of claim 1 wherein:
   the checkpoint includes copy on write data from a first memory of the active mobile device.

3. The system of claim 2 wherein:
   the checkpoint includes a difference between a current state of a second memory and a reference memory.

4. The system of claim 1 wherein:
   the checkpoint engine detects a connection to a second registered standby mobile device;
   the checkpoint engine transmitting the merged checkpoint to the second registered standby mobile device over the wireless network.

5. A method for synchronizing a virtual machine, the method comprising:
   executing a checkpoint engine, the checkpoint engine executing a process including:
      initiating distribution of a base virtual machine image to registered standby mobile devices over a wireless network;
      receiving a checkpoint from an active mobile device, the checkpoint indicating a change in a memory of the active mobile device;
      detecting a first registered standby mobile device connected to the checkpoint engine;
      transmitting the checkpoint to the first registered standby mobile device over the wireless network;
      queuing checkpoints to create queued checkpoints in response to the standby mobile device being disconnected or in a low bandwidth environment;
      merging successive queued checkpoints from the active mobile device to define a merged checkpoint, the merged checkpoint representing changes in the virtual machine from a first state to a second state, and then from the second state to a third state;
      detecting a connection to a second registered standby mobile device; and
      transmitting the merged checkpoint to the second registered standby mobile device over the wireless network;
   wherein the checkpoint received from the active mobile device is created at the active mobile device in response to operating conditions of the active mobile device including power status, battery life and network connectivity.

6. The method of claim 5 wherein:
   the checkpoint includes copy on write data from a first memory of the active mobile device.

7. The method of claim 5 wherein:
   the checkpoint includes a difference between a current state of a second memory and a reference memory.

8. The system of claim 1 wherein:
   the receiving the checkpoint from the active mobile device is in response to the active mobile device moving from a first area having a first network bandwidth to a second area having a second network bandwidth, the second network bandwidth being greater than the first network bandwidth.

9. The method of claim 5 wherein:
   the receiving the checkpoint from the active mobile device is in response to the active mobile device moving from a first area having a first network bandwidth to a second area having a second network bandwidth, the second network bandwidth being greater than the first network bandwidth.

10. A method for synchronizing a virtual machine, the method comprising:
executing a checkpoint engine, the checkpoint engine executing a process including:
  initiating distribution of a base virtual machine image to registered standby mobile devices over a wireless network;
  receiving a checkpoint from an active mobile device, the checkpoint indicating a change in a memory of the active mobile device;
  detecting a first registered standby mobile device connected to the checkpoint engine;
  transmitting the checkpoint to the first registered standby mobile device over the wireless network;
  queuing checkpoints to create queued checkpoints in response to the standby mobile device being disconnected or in a low bandwidth environment;
  merging successive queued checkpoints from the active mobile device to define a merged checkpoint, the merged checkpoint representing changes in the virtual machine from a first state to a second state, and then from the second state to a third state;
  detecting a connection to a second registered standby mobile device; and
  transmitting the merged checkpoint to the second registered standby mobile device over the wireless network;
wherein the checkpoint received from the active mobile device is created at the active mobile device in response to the active mobile device moving from a first area having a first network bandwidth to a second area having a second network bandwidth, the second network bandwidth being greater than the first network bandwidth;
wherein the checkpoint includes copy on write data from a first memory of the active mobile device;
wherein the checkpoint includes a difference between a current state of a second memory and a reference memory.

* * * * *